United States Patent
Nagaoka et al.

(10) Patent No.: US 12,183,493 B2
(45) Date of Patent: *Dec. 31, 2024

(54) FERRITE SINTERED MAGNET, FERRITE PARTICLES, BONDED MAGNET, MOTOR, AND GENERATOR

(71) Applicant: TDK Corporation, Tokyo (JP)

(72) Inventors: Junnichi Nagaoka, Tokyo (JP); Hitoshi Taguchi, Tokyo (JP); Yuichi Sugawara, Tokyo (JP); Jo Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,721

(22) Filed: May 19, 2023

(65) Prior Publication Data

US 2023/0290547 A1 Sep. 14, 2023

Related U.S. Application Data

(63) Continuation of application No. 16/469,833, filed as application No. PCT/JP2017/046220 on Dec. 22, 2017, now Pat. No. 11,810,699.

(30) Foreign Application Priority Data

Dec. 22, 2016 (JP) .................. 2016-249675

(51) Int. Cl.
| | |
|---|---|
| H01F 1/11 | (2006.01) |
| C04B 35/26 | (2006.01) |
| C04B 35/626 | (2006.01) |
| C04B 35/64 | (2006.01) |
| H01F 1/10 | (2006.01) |
| H01F 1/113 | (2006.01) |
| H02K 1/02 | (2006.01) |

(52) U.S. Cl.
CPC ............ *H01F 1/11* (2013.01); *C04B 35/2633* (2013.01); *C04B 35/6262* (2013.01); *C04B 35/62625* (2013.01); *C04B 35/64* (2013.01); *H01F 1/10* (2013.01); *H01F 1/113* (2013.01); *H02K 1/02* (2013.01); *C04B 2235/3274* (2013.01); *C04B 2235/3409* (2013.01); *C04B 2235/3418* (2013.01); *C04B 2235/605* (2013.01); *C04B 2235/606* (2013.01); *C04B 2235/6567* (2013.01); *C04B 2235/76* (2013.01)

(58) Field of Classification Search
CPC ... H01F 1/11; H01F 1/10; H01F 1/113; C04B 35/2633; C04B 2235/3274; C04B 2235/3409
See application file for complete search history.

(56) References Cited

U.S. PATENT DOCUMENTS

| | | | |
|---|---|---|---|
| 7,837,893 B2 | 11/2010 | Takami et al. | |
| 7,919,007 B2 | 4/2011 | Minachi et al. | |
| 8,206,606 B2 | 6/2012 | Hosokawa et al. | |
| 8,303,837 B2 | 11/2012 | Takami et al. | |
| 9,162,928 B2 | 10/2015 | Oda et al. | |
| 11,810,699 B2* | 11/2023 | Nagaoka | H02K 1/02 |
| 2009/0022992 A1 | 1/2009 | Takami et al. | |
| 2009/0218540 A1* | 9/2009 | Takami | C04B 35/62675 |
| | | | 252/62.57 |
| 2009/0314981 A1 | 12/2009 | Yanagida et al. | |
| 2011/0024672 A1 | 2/2011 | Takami et al. | |
| 2012/0211910 A1* | 8/2012 | Takami | H01F 1/11 |
| | | | 264/37.29 |
| 2012/0280167 A1 | 11/2012 | Yanagida et al. | |
| 2014/0097378 A1 | 4/2014 | Yanagida et al. | |
| 2015/0170811 A1 | 6/2015 | Tanigawa et al. | |
| 2015/0221424 A1 | 8/2015 | Kobayashi et al. | |

FOREIGN PATENT DOCUMENTS

| | | | |
|---|---|---|---|
| EP | 2244269 | * | 5/2015 |
| EP | 2905790 | * | 8/2015 |
| JP | 2009-120442 A | | 6/2009 |
| JP | 2015-130493 A | | 7/2015 |
| WO | WO-2007/105398 A1 | | 9/2007 |
| WO | WO-2008/146712 A1 | | 12/2008 |

OTHER PUBLICATIONS

International Preliminary Report on Patentability mailed Jul. 4, 2019 for PCT/JP2017/046220.

* cited by examiner

*Primary Examiner* — C Melissa Koslow
(74) *Attorney, Agent, or Firm* — Faegre Drinker Biddle & Reath LLP

(57) ABSTRACT

Provided is a ferrite sintered magnet including a ferrite phase having a magnetoplumbite-type crystal structure. x, y, and m satisfy the following Equations (1), (2), and (3) when composition of the ferrite sintered magnet is represented by $R_{1-x}A_xFe_{m-y}Co_y$, where R denotes at least one kind of element selected from rare earth elements including Y and A denotes Ca or Ca and elements including at least one kind selected from Sr or Ba. The content of B in the ferrite sintered magnet is from 0.1% to 0.6% by mass in terms of $B_2O_3$.

$0.2 \leq x \leq 0.8$     (1)

$0.1 \leq y \leq 0.65$     (2)

$3 \leq m \leq 14$     (3)

16 Claims, 5 Drawing Sheets

FERRITE SINTERED MAGNET, FERRITE PARTICLES, BONDED MAGNET, MOTOR, AND GENERATOR

TECHNICAL FIELD

The present disclosure relates to a ferrite sintered magnet, ferrite particles, a bonded magnet, a motor, and a generator.

BACKGROUND ART

As magnetic materials to be used in ferrite sintered magnets, Ba ferrite, Sr ferrite, and Ca ferrite having a hexagonal crystal structure are known. As such a crystal structure of ferrite, magnetoplumbite type (M type), W type and the like are known. Among these, magnetoplumbite-type (M-type) ferrite is mainly adopted as a magnet material for motors and the like. The M-type ferrite is usually represented by the general formula of $AFe_{12}O_{19}$.

Generally, residual magnetic flux density (Br) and coercive force (HcJ) are used as indices of magnetic properties of ferrite sintered magnets. Hitherto, it has been attempted to add various elements different from the constituent elements of ferrite from the viewpoint of improving Br and HcJ. For example, in Patent Literature 1, it is attempted to improve the magnetic properties by substituting a part of the elements at the A site with Ca and a rare earth element (R) and a part of the elements at the B site with Co.

CITATION LIST

Patent Literature

Patent Literature 1: International Publication No. 2008/146712

SUMMARY OF INVENTION

Technical Problem

It is being attempted to miniaturize motors, generators and the like that are the main applications of ferrite sintered magnets in the respective technical fields. For this reason, the internal structure is complicated and the installation space of magnet is also being diminished. Hence, it is conceivable to decrease the thickness of ferrite sintered magnets in order to diminish the installation space. However, there is concern that the ferrite sintered magnets may be demagnetized by the demagnetizing field when the thickness thereof is decreased.

Accordingly, in an aspect, the present invention provides a ferrite sintered magnet having a sufficiently high coercive force. In another aspect, the present invention provides ferrite particles having a sufficiently high coercive force and a bonded magnet containing the same. In still another aspect, the present invention provides a motor and a generator which are equipped with a ferrite sintered magnet or bonded magnet having a sufficiently high coercive force.

Solution to Problem

In an aspect, the present invention provides a ferrite sintered magnet comprising a ferrite phase having a magnetoplumbite-type crystal structure, in which x, y, and m satisfy the following Equations (1), (2), and (3) when composition of the ferrite sintered magnet is represented by $R_{1-x}A_xFe_{m-y}Co_y$, where R denotes at least one kind of element selected from rare earth elements including Y and A denotes Ca or Ca and elements including at least one kind selected from Sr or Ba:

$$0.2 \leq x \leq 0.8 \quad (1)$$

$$0.1 \leq y \leq 0.65 \quad (2)$$

$$3 \leq m < 14 \quad (3), \text{ and}$$

a content of B is from 0.1% to 0.6% by mass in terms of $B_2O_3$.

The ferrite sintered magnet has a sufficiently high coercive force. Such a ferrite sintered magnet can be mounted on, for example, a motor and a generator by being decreased in thickness and thus can contribute to the miniaturization of a motor, a generator or the like. Such a ferrite sintered magnet can be used in various applications as well as in a motor and a generator.

It is preferable that the content of B in the ferrite sintered magnet is more than 0.2% by mass and 0.4% by mass or less in terms of $B_2O_3$. This makes it possible to obtain a ferrite sintered magnet having a still higher coercive force. In addition, the coercive force at a temperature lower than room temperature is higher than the coercive force at room temperature. This makes it possible to suppress irreversible low temperature demagnetization. Further, it is possible to obtain a ferrite sintered magnet exhibiting superior magnetic properties at a temperature lower than room temperature. Furthermore, the absolute value of the temperature coefficient of residual magnetic flux density decreases. This makes it possible to obtain a ferrite sintered magnet having a small change in residual magnetic flux density due to a temperature change.

It is preferable that the ferrite sintered magnet satisfies the following Equations (4) and (5).

$$0.2 \leq x < 0.55 \quad (4)$$

$$7.5 < m < 14 \quad (5)$$

As Equations (4) and (5) above are satisfied, the coercive force at a temperature lower than room temperature is higher than the coercive force at room temperature. This makes it possible to suppress irreversible low temperature demagnetization. In addition, it is possible to obtain a ferrite sintered magnet exhibiting superior magnetic properties at a low temperature. Furthermore, the absolute value of the temperature coefficient of residual magnetic flux density decreases. This makes it possible to obtain a ferrite sintered magnet having a small change in residual magnetic flux density due to a temperature change.

In another aspect, the present invention provides a ferrite particle comprising a ferrite phase having a magnetoplumbite-type crystal structure and in which x, y, and m satisfy the following Equations (1), (2), and (3) when composition of the ferrite particle is represented by $R_{1-x}A_xFe_{m-y}Co_y$, where R denotes at least one kind of element selected from rare earth elements including Y and A denotes Ca or Ca and elements including at least one kind selected from Sr or Ba:

$$0.2 \leq x \leq 0.8 \quad (1)$$

$$0.1 \leq y \leq 0.65 \quad (2)$$

$$3 \leq m < 14 \quad (3), \text{ and}$$

a content of B is from 0.1% to 0.6% by mass in terms of $B_2O_3$.

The ferrite particles have a sufficiently high coercive force. A ferrite sintered magnet and a bonded magnet in which such ferrite particles are used can be mounted on, for example, a motor and a generator by being decreased in thickness and thus can contribute to the miniaturization of a motor, a generator or the like. Such ferrite particles can be used in various applications as well as for ferrite sintered magnets and for bonded magnets.

It is preferable that the content of B in the ferrite particles is more than 0.2% by mass and 0.4% by mass or less in terms of $B_2O_3$. This makes it possible to further increase the coercive force. In addition, the coercive force at a temperature lower than room temperature is higher than the coercive force at room temperature. This makes it possible to suppress irreversible low temperature demagnetization. Further, it is possible to obtain ferrite particles exhibiting excellent magnetic properties at a temperature lower than room temperature. Furthermore, the absolute value of the temperature coefficient of residual magnetic flux density decreases. This makes it possible to obtain ferrite particles having a small change in residual magnetic flux density due to a temperature change.

It is preferable that the ferrite particles satisfy the following Equations (4) and (5).

$$0.2 \leq x < 0.55 \quad (4)$$

$$7.5 < m < 14 \quad (5)$$

As Equations (4) and (5) above are satisfied, the coercive force at a temperature lower than room temperature is higher than the coercive force at room temperature. This makes it possible to suppress irreversible low temperature demagnetization. In addition, it is possible to obtain ferrite particles exhibiting excellent magnetic properties at a low temperature. Furthermore, the absolute value of the temperature coefficient of residual magnetic flux density decreases. This makes it possible to obtain ferrite particles having a small change in residual magnetic flux density due to a temperature change.

In still another aspect, the present invention provides a bonded magnet containing the ferrite particles described above. This bonded magnet contains the ferrite particles described above and thus has a sufficiently high coercive force. For this reason, the bonded magnet can be mounted on, for example, a motor and a generator by being decreased in thickness and thus can contribute to the miniaturization of a motor, a generator or the like. Such a bonded magnet can be used in various applications as well as in a motor and a generator.

In yet another aspect, the present invention provides a motor including the ferrite sintered magnet or bonded magnet described above. In yet still another aspect, the present invention provides a generator including the ferrite sintered magnet or bonded magnet described above. Such motor and generator can be sufficiently miniaturized.

Advantageous Effects of Invention

It is possible to provide a ferrite sintered magnet having a sufficiently high coercive force. In addition, it is possible to provide ferrite particles having a sufficiently high coercive force and a bonded magnet containing the same. Furthermore, it is possible to provide a motor and a generator which are equipped with a ferrite sintered magnet or bonded magnet having a sufficiently high coercive force.

DESCRIPTION OF EMBODIMENTS

Hereinafter, several embodiments of the present invention will be described in detail.

Figure 1:
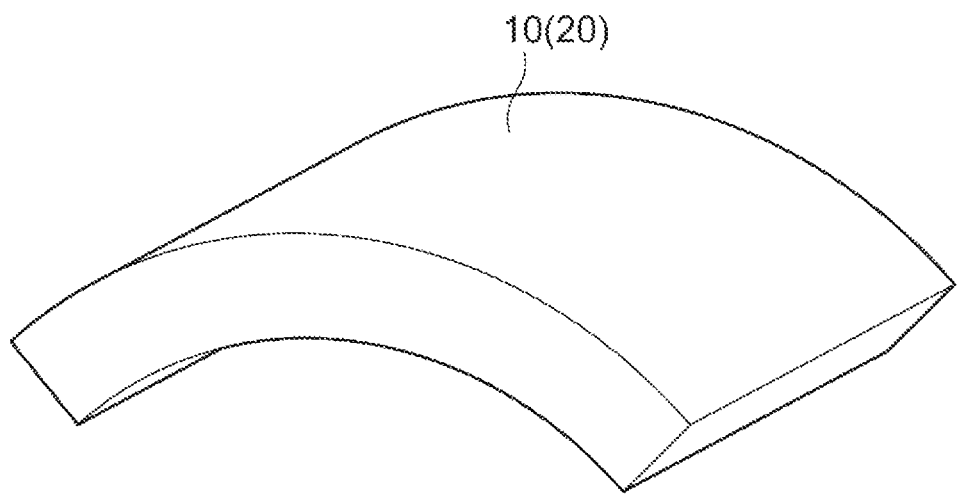
FIG. 1 is a perspective view which schematically illustrates an embodiment of a ferrite sintered magnet or bonded magnet.

FIG. 1 is a perspective view which schematically illustrates a ferrite sintered magnet or a bonded magnet according to an embodiment. An anisotropic ferrite sintered magnet 10 has a curved shape so that the end face thereof has an arc shape and generally has a shape called an arc segment shape, a C shape, a tile shape, or a bow shape. The ferrite sintered magnet 10 is suitably used, for example, as a magnet for a motor or a generator. However, the shape of the ferrite sintered magnet is not limited to the shape illustrated in FIG. 1.

The ferrite sintered magnet and ferrite particles have a ferrite phase having a magnetoplumbite-type crystal structure. It is preferable that the ferrite sintered magnet and ferrite particles have the ferrite phase as a main phase from the viewpoint of sufficiently enhancing the magnetic properties. Incidentally, in the present specification, the "main phase" refers to a crystal phase which is contained in the ferrite sintered magnet and ferrite particles in the largest amount. The ferrite sintered magnet and ferrite particles may have a crystal phase (heterogenous phase) different from the main phase.

The compositions of the ferrite sintered magnet and ferrite particles satisfy the following Equations (1), (2), and (3) when being represented by the following General Formula (I). In General Formula (I), x, y, and m denote ratios based on moles. In General Formula (I), R denotes at least one kind of element selected from rare earth elements including Y, and A denotes Ca or Ca and elements including at least one kind selected from Sr or Ba.

$$R_{1-x}A_xFe_{m-y}Co_y \quad (I)$$

$$0.2 \leq x \leq 0.8 \quad (1)$$

$$0.1 \leq y \leq 0.65 \quad (2)$$

$$3 \leq m < 14 \quad (3).$$

From the viewpoint of further increasing the coercive force, x in General Formula (I) may be 0.7 or less or 0.6 or less. From the same viewpoint, x may be 0.25 or more or 0.3 or more. In addition, x may be less than 0.55 or 0.5 or less from the viewpoint of suppressing irreversible low temperature demagnetization. From the viewpoint of further enhancing the magnetic properties, y in General Formula (I) may be 0.6 or less or 0.5 or less. From the same viewpoint, y in General Formula (I) may be 0.15 or more or 0.2 or more. From the viewpoint of further increasing the coercive force, m in General Formula (I) may be 4 or more or 5 or more. From the same viewpoint, m in General Formula (I) may be 13 or less or 12 or less. From the viewpoint of suppressing irreversible low temperature demagnetization, m in General Formula (I) is preferably more than 7.5 and more preferably 8 or more. From the viewpoint of suppressing irreversible low temperature demagnetization while further increasing the coercive force m in General Formula (I) may be from 8 to 13 or from 8 to 12.

It is preferable that the ferrite sintered magnet satisfy Equations (4) and (5).

$$0.25 \leq x < 0.55 \quad (4)$$

$$7.5 < m < 14 \quad (5)$$

As Equations (4) and (5) above are satisfied, irreversible low temperature demagnetization is further suppressed and a ferrite sintered magnet exhibiting superior magnetic properties at a low temperature can be obtained.

It is preferable that A in General Formula (I) contains Ca or Ca and Sr as main components from the viewpoint of enhancing the magnetic properties. A may be composed of only Ca or only Ca and Sr.

There is a case in which the residual magnetic flux density of the magnetized ferrite magnet decreases when being cooled to a sufficiently low temperature and then returned to the original temperature again. This is called irreversible low temperature demagnetization. Such irreversible low temperature demagnetization is an essential weakness of conventional ferrite magnets. The ferrite sintered magnet of the present embodiment has a sufficiently high coercive force, and irreversible low temperature demagnetization can be thus suppressed. In addition, the irreversible low temperature demagnetization can also be suppressed by setting the temperature coefficient of HcJ to 0%/° C. or less.

It is desirable that the absolute value of the temperature coefficient of the residual magnetic flux density of the ferrite magnet is as small as possible. This makes it possible to obtain a ferrite magnet having a small decrease in residual magnetic flux density with respect to a temperature change. Furthermore, the irreversible low temperature demagnetization due to temperature can be further suppressed as the absolute value of the temperature coefficient of the residual magnetic flux density of the ferrite sintered magnet is smaller in a case in which both the temperature coefficient of coercive force and the temperature coefficient of residual magnetic flux density are negative characteristic.

General Formula (I) may be represented by General Formula (II) in several embodiments. x in General Formula (I) is equal to x1+x2 in General Formula (II). Hence, the description regarding the range of x also applies to the range of x1+x2. In General Formula (II), R denotes at least one kind of element selected from rare earth elements including Y and E denotes at least one kind of element selected from the group consisting of Sr and Ba.

$$R_{1-x1-x2}Ca_{x1}E_{x2}Fe_{m-y}Co_{y} \quad (II)$$

The composition of the ferrite sintered magnet satisfies the following Equations (6), (7), (8), and (9) when being represented by General Formula (II). In General Formula (II), x1, x2, y, and m denote ratios based on moles. In other words, the composition of the ferrite sintered magnet may satisfy Equations (6), (7), (8), and (9) when being represented by General Formula (II) while satisfying Equation (1) when being represented by General Formula (I).

$$0.1 \leq x1 \leq 0.65 \quad (6)$$

$$0 \leq x2 < 0.5 \quad (7)$$

$$0.1 \leq y \leq 0.65 \quad (8)$$

$$3 \leq m < 14 \quad (9)$$

From the viewpoint of further increasing the coercive force, x1 in General Formula (II) may be 0.7 or less or 0.6 or less. From the same point of view, x1 may be 0.20 or more or 0.3 or more. From the viewpoint of further increasing the coercive force, x2 in General Formula (II) may be 0.4 or less or 0.3 or less. x2 in General Formula (II) may be 0.

From the viewpoint of further enhancing the magnetic properties, y in General Formula (II) may be 0.6 or less or 0.5 or less. From the same viewpoint, y in General Formula (II) may be 0.15 or more or 0.2 or more. From the viewpoint of further increasing the coercive force, m in General Formula (II) may be 4 or more or 5 or more. From the same viewpoint, m in General Formula (II) may be 13 or less or 12 or less. From the viewpoint of improving the magnetic properties at a low temperature, m in General Formula (II) is preferably more than 7.5 and more preferably 8 or more. From the viewpoint of suppressing irreversible low temperature demagnetization while further increasing the coercive force, m in General Formula (II) may be from 8 to 13 or from 8 to 12.

It is preferable that the ferrite sintered magnet satisfy Equations (10) and (11).

$$0.2 \leq x1+x2 < 0.55 \quad (10)$$

$$7.5 < m < 14 \quad (11)$$

As Equations (10) and (11) above are satisfied, irreversible low temperature demagnetization is further suppressed and a ferrite sintered magnet exhibiting superior magnetic properties at a low temperature can be obtained.

The content ratio of the respective elements in General Formula (I) and General Formula (II) can be measured by fluorescent X-ray analysis. Incidentally, the content ratio of the respective elements in General Formula (I) and General Formula (II) is usually the same as the blending ratio of the respective raw materials in the blending step to be described later. The content of B (boron) can be measured by inductively coupled plasma-atomic emission spectroscopy (ICP-atomic emission spectroscopy).

The content of B in the ferrite sintered magnet and ferrite particles is from 0.1% to 0.6% by mass in terms of $B_2O_3$. From the viewpoint of further enhancing the magnetic properties, the content of B may be 0.5% by mass or less or 0.4% by mass or less. From the same viewpoint, the content of B may be more than 0.1% by mass, 0.11% by mass or more, 0.14% by mass or more, or more than 0.2% by mass. In addition, the content of B may be more than 0.20% by mass, 0.21% by mass or more, or 0.22% by mass or more from the viewpoint of sufficiently improving the coercive force at a temperature lower than room temperature than the coercive force at room temperature.

It is preferable that E in General Formula (II) contains Sr as a main component from the viewpoint of enhancing the magnetic properties. E may be composed only of Sr.

It is preferable that R in General Formula (I) and General Formula (II) contains one or more kinds of elements selected from the group consisting of La (lanthanum), Ce (cerium), Pr (praseodymium), Nd (neodymium), and Sm (samarium), and it is more preferable that R contains La. R may be composed only of La.

The ferrite sintered magnet and ferrite particles may contain an element which is not presented in General Formula (I) or (II) above as an sub-component. Examples of the sub-component may include Si and Na. These sub-components are, for example, contained in the ferrite sintered magnet as the respective oxides or composite oxides thereof.

The content of Si in the ferrite sintered magnet and ferrite particles may be, for example, from 0% to 3% by mass when Si is converted into $SiO_2$. From the viewpoint of further enhancing the magnetic properties, the content of Si in the ferrite sintered magnet and ferrite particles may be less than 0.3% by mass when Si is converted into $SiO_2$. From the same point of view, the total content of Si and B in the ferrite sintered magnet and ferrite particles may be from 0.1% to 0.8% by mass, from 0.1% to 0.6% by mass, or from 0.2% to 0.5% by mass when Si and B are converted into $SiO_2$ and $B_2O_3$, respectively. The content of Si (silicon) can be measured by inductively coupled plasma-atomic emission spectroscopy (ICP-atomic emission spectroscopy). The content of Na in the ferrite sintered magnet and ferrite particles may be, for example, from 0% to 0.2% by mass when Na is converted into $Na_2O$.

The content of Na in the ferrite sintered magnet and ferrite particles may be, for example, 0.2% by mass or less, from 0.01% to 0.15% by mass, or from 0.02% to 0.1% by mass when Na is converted into $Na_2O$.

The ferrite sintered magnet and ferrite particles may contain impurities contained in the raw materials or unavoidable components derived from production facilities in addition to the components described above. Examples of such a component may include Ti (titanium), Cr (chromium), Mn (manganese), Mo (molybdenum), V (vanadium), and Al (aluminum). These components may be contained in the ferrite sintered magnet and the ferrite particles as the respective oxides or composite oxides thereof. The contents of the sub-components, impurities, and unavoidable components described above can be measured by fluorescent X-ray analysis or ICP-atomic emission spectroscopy. The sub-components may be segregated at the grain boundaries of the ferrite crystal grains in the ferrite sintered magnet to form a heterogenous phase.

The average grain diameter of crystal grains (ferrite particles) containing a ferrite phase in the ferrite sintered magnet may be, for example, 5 μm or less, 4.0 μm or less, or from 0.5 to 3.0 μm. The coercive force can be further increased as the crystal grains have such an average grain diameter. The average grain diameter of the crystal grains of the ferrite sintered magnet can be determined using an observation image for the cross section of the ferrite sintered magnet taken by TEM or SEM. Specifically, the particle size distribution is measured by subjecting an observation image which contains several hundreds of crystal grains and is taken by SEM or TEM to image processing. The average value of the grain diameter of crystal grains based on the number is calculated from the particle size distribution based on the number measured. The average value measured in this manner is taken as the average grain diameter of the crystal grains.

The ferrite particles may be crystal grains containing a ferrite phase in the ferrite sintered magnet or may be in a powder form. The powdery ferrite particles can be obtained, for example, through a pulverization step to be described later. The average particle diameter of the ferrite particles can also be determined using an observation image for the cross section of the ferrite sintered magnet taken by TEM or SEM in the same manner as the average grain diameter of the crystal grains of the ferrite sintered magnet.

The coercive force of the ferrite sintered magnet and ferrite particles at 20° C. is, for example, preferably 4900 Oe or more and more preferably 5000 Oe or more. The residual magnetic flux density of the ferrite sintered magnet at 20° C. is preferably 3000 G or more and more preferably 3500 G or more. It is preferable that the ferrite sintered magnet is excellent in both the coercive force (HcJ) and the residual magnetic flux density (Br).

The coercive force of the ferrite sintered magnet and ferrite particles at −30° C. is, for example, preferably 4900 Oe or more and more preferably 5000 Oe or more. The temperature coefficient of HcJ to be calculated from the values of HcJ at −30° C. and 20° C. may be from −0.03 to 0%/° C. or from −0.01 to 0%/° C. This makes it possible to sufficiently overcome the irreversible low temperature demagnetization as well as to have a practical residual magnetic flux density and a practical coercive force.

The absolute value of the temperature coefficient of residual magnetic flux density of the ferrite sintered magnet and ferrite particles may be less than |0.187|%/° C. or less than |0.179|%/° C. This makes it possible to sufficiently overcome the irreversible low temperature demagnetization as well as to have a practical residual magnetic flux density and a practical coercive force.

The ferrite sintered magnet can be used in, for example, a motor or a generator. More specifically, the ferrite sintered magnet can be used as a magnet of a motor for motor vehicles such as for fuel pumps, for power windows, for ABS (antilock brake system), for fans, for wipers, for power steering, for active suspensions, for starters, for door locks, and for electric mirrors. In addition, the ferrite sintered magnet can be used as a magnet of a motor for OA/AV equipment such as for FDD spindles, for VTR capstans, for VTR rotary heads, for VTR reels, for VTR loadings, for VTR camera capstans, for VTR camera rotary heads, for VTR camera zooms, for VTR camera focuses, for capstans such as radio cassettes, for CD/DVD/MD spindles, for CD/DVD/MD loadings, and CD/DVD optical pickups. Further, the ferrite sintered magnet can also be used as a magnet of a motor for household appliances such as for air conditioner compressors, for freezer compressors, for electric tools, for dryer fans, for shaver driving, and for electric toothbrushes. Furthermore, the ferrite sintered magnet can also be used as a magnet of a motor for FA equipment such as for robot axes, for joint driving, for robot main driving, for machine tool table driving, and for machine tool belt driving.

The ferrite particles have a sufficiently high coercive force. The ferrite sintered magnet and bonded magnet containing such ferrite particles can maintain the efficiency of motors, generators and the like at a sufficiently high level even when being mounted on the motors, generators and the like by being decreased in thickness for miniaturization of motors, generators and the like. The ferrite sintered magnet and bonded magnet containing the ferrite particles can be suitably used in the respective applications described above.

Figure 2:
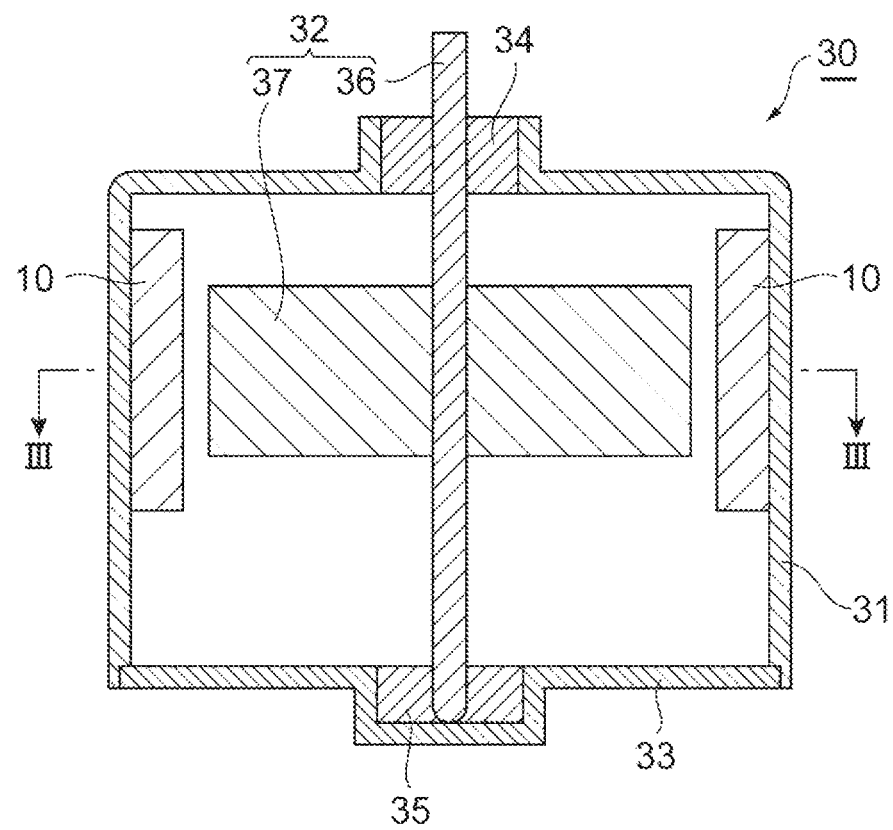
FIG. 2 is a schematic cross-sectional view which illustrates an embodiment of a motor.

FIG. 2 is a schematic cross-sectional view which illustrates an embodiment of a motor. A motor 30 of the present embodiment is equipped with the ferrite sintered magnet 10. The motor 30 is a direct current motor with a brush and is equipped with a cylindrical housing 31 (stator) with a bottom and a rotatable rotor 32 concentrically disposed on the inner circumferential side of the housing 31. The rotor 32 is equipped with a rotor shaft 36 and a rotor core 37 fixed on the rotor shaft 36. A bracket 33 is fitted at the opening of the housing 31, and the rotor core is accommodated in the space formed by the housing 31 and the bracket 33. The rotor shaft 36 is rotatably supported by bearings 34 and 35 respectively provided at the central portion of the housing 31 and the central portion of the bracket 33 so as to face each other. Two C-type ferrite sintered magnets 10 are fixed to the inner circumferential surface of the cylindrical portion of the housing 31 so as to face each other.

Figure 3:
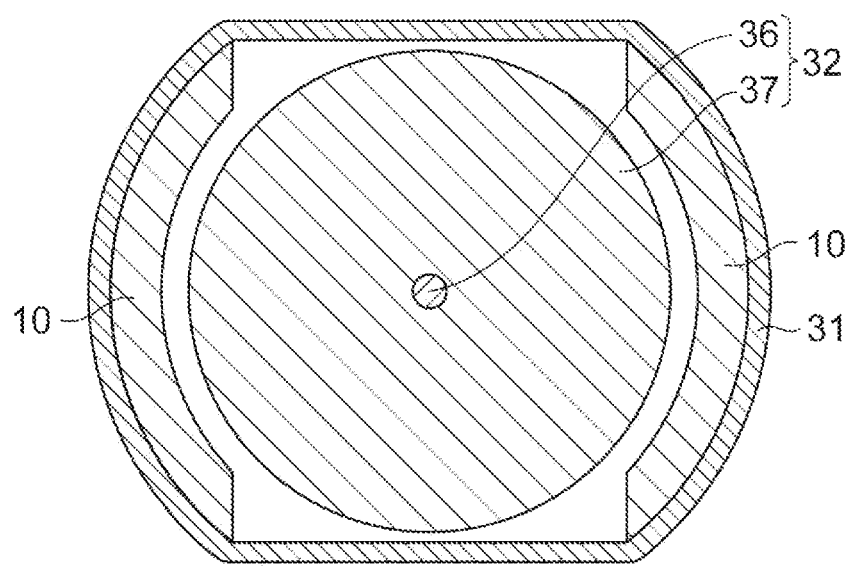
FIG. 3 is a cross-sectional view which is taken along the line III-III of the motor in FIG. 2.

FIG. 3 is a cross-sectional view which is taken along the line III-III of the motor 30 in FIG. 2. The ferrite sintered magnet 10 as a magnet for motor is bonded on the inner circumferential surface of the housing 31 using a bonding agent by taking the outer circumferential surface as a bonding surface. The ferrite sintered magnet 10 can be decreased in thickness, and thus the gap between the housing 31 and the rotor 32 can be formed to be sufficiently narrow. Hence, the motor 30 can be miniaturized while maintaining the performance.

Next, embodiments of the bonded magnet will be described below. A bonded magnet 20 according to an embodiment has a curved shape so that the end face thereof has an arc shape and generally has a shape called an arc segment shape, a C shape, a tile shape, or a bow shape. The bonded magnet 20 is suitably used, for example, as a magnet for a motor or a generator. However, the shape of the bonded magnet of the present embodiment is not limited to the shape illustrated in FIG. 1.

The bonded magnet of the present embodiment contains a resin and the above-described ferrite particles which are fixed to the resin. Examples of the resin may include thermosetting resins such as an epoxy resin, a phenol resin, a resin having a polyaromatic ring, and a resin having a triazine ring (triazine resin); and thermoplastic resins such as polyamide-based elastomers such as styrene-based, olefin-based, urethane-based, polyester-based, and nylon elastomers, ionomers, ethylene propylene copolymer (EPM), and ethylene-ethyl acrylate copolymer.

The content rate of the resin in the bonded magnet may be, for example, from 0.5% to 10% by mass or from 1% to 5% by mass from the viewpoint of achieving both excellent magnetic properties and excellent shape retaining property. The content rate of the resin in the bonded magnet can be adjusted by changing the resin concentration in the solution containing the resin to be used at the time of manufacture and the molding pressure at the time of the compact fabrication. From the same viewpoint, the content rate of the ferrite particles in the bonded magnet may be, for example, from 90% to 99.5% by mass or from 95% to 99% by mass.

Next, an example of the method of manufacturing the ferrite particles, ferrite sintered magnet, and bonded magnet will be described. The manufacturing method to be described below includes a blending step, a calcination step, a pulverization step, a molding step, and a firing step. The details of the respective steps will be described below.

In the blending step, a plurality of raw materials is blended together and a raw material composition is thus obtained. Examples of the raw materials may include a compound (raw material compound) containing one kind or two or more kinds containing at least one selected from the group consisting of an element presented in General Formula (I) or (II) and boron as a constituent element. As the raw material compound, for example, one in the powder form is suitable. Examples of the raw material compound may include an oxide or a compound (a carbonate, a hydroxide, a nitrate or the like) to be an oxide by firing. Examples thereof may include $SrCO_3$, $La(OH)_3$, $Fe_2O_3$, $BaCO_3$, $CaCO_3$, $Co_3O_4$, and $B_2O_3$. The average particle diameter of the powder of the raw material compound is, for example, about from 0.1 to 2.0 μm, for example, from the viewpoint of facilitating the blending.

Boron compounds such as boron oxide tend to be more soluble in water than other raw materials and to be easily scattered under heating conditions. For this reason, it is required to set the blending proportion of the boron compound in the raw material composition in the blending step to be higher as compared with the content proportion of boron in the intended products such as the ferrite sintered magnet and ferrite particles. The ratio of the blending proportion to the content proportion is, for example, from 120% to 300%.

In the blending step, raw material compounds (element simple substances, oxides and the like) of sub-components may be blended if necessary. The raw material composition can be obtained by, for example, weighing and mixing the respective raw materials so as to obtain a desired ferrite sintered magnet and then subjecting the mixture to a mixing and pulverization treatment for about from 0.1 to 20 hours using a wet attritor, a ball mill and the like.

In the calcination step, the raw material composition obtained in the blending step is calcined. The calcination is preferably conducted, for example, in an oxidizing atmosphere such as air. The temperature for calcination may be, for example, from 1100° C. to 1400° C. or from 1100° C. to 1300° C. The calcination time may be, for example, from 1 second to 10 hours or from 1 second to 3 hours. The ratio of the ferrite phase (M phase) in the calcined powder (ferrite particles) to be obtained by calcination may be, for example, 70% by volume or more or 75% by volume or more. This ratio of the ferrite phase can be determined in the same manner as the ratio of the ferrite phase in the ferrite sintered magnet.

In the pulverization step, the calcined powder which has been granulated or aggregated by the calcination step is pulverized. The ferrite particles are thus obtained. The pulverization step may be carried out by being divided into two steps of, for example, pulverizing the calcined powder into a coarse powder (coarse pulverization step) and then further finely pulverizing this coarse powder (fine pulverization step).

The coarse pulverization can be conducted, for example, using a vibration mill and the like until the average particle diameter of the calcined powder becomes from 0.5 to 5.0 μm. In fine pulverization, the coarse powder obtained by coarse pulverization is further pulverized using a wet attritor, a ball mill, a jet mill and the like. In the fine pulverization, pulverization is conducted so that the average particle diameter of the fine powder (ferrite particles) to be obtained becomes, for example, about from 0.08 to 2.0 μm. The specific surface area of fine powder (for example, to be determined by a BET method) is, for example, about from 7 to 12 m$^2$/g. The suitable pulverization time varies depending on the pulverization method, and for example, the time is from 30 minutes to 10 hours in the case of using a wet attritor and from 10 to 50 hours in the case of wet pulverization using a ball mill. The specific surface area of the ferrite particles can be measured using a commercially available BET specific surface area measuring apparatus (trade name: HM Model-1210 manufactured by MOUNTECH Co., Ltd.).

In the pulverization step, for example, a polyhydric alcohol represented by a general formula $C(OH)_nH_{n+2}$ may be added in order to increase the degree of magnetic orientation of the sintered body to be obtained after firing. n in the general formula may be, for example, from 4 to 100 or from 4 to 30. Examples of the polyhydric alcohol may include sorbitol. In addition, two or more kinds of polyhydric alcohols may be concurrently used. Furthermore, other known dispersants may be concurrently used in addition to the polyhydric alcohol.

In a case in which a polyhydric alcohol is added, the amount thereof added may be, for example, from 0.05% to 5.0% by mass or from 0.1% to 3.0% by mass with respect to the target of addition (for example, coarse powder). Incidentally, the polyhydric alcohol added in the fine pulverization step is thermally decomposed and removed in the firing step to be described later.

In the coarse pulverization step and/or the fine pulverization step, a powder such as $SiO_2$ may be added as an sub-component. It is possible to improve the sinterability and magnetic properties by adding such an sub-component. However, it is preferable to adjust the amount of $SiO_2$ added so as not to be excessive from the viewpoint of sufficiently enhancing the magnetic properties. Incidentally, it is preferable to blend these sub-components to be more than the intended content in the ferrite sintered magnet 10 since there is a case in which these sub-components flow out together with the solvent of the slurry in the case of conducting molding by a wet method.

In the molding step, the ferrite particles obtained in the pulverization step are molded in a magnetic field and a compact is thus obtained. Molding can be conducted by either method of dry molding or wet molding. It is preferable that molding is conducted by wet molding from the viewpoint of increasing the degree of magnetic orientation.

In the case of conducting molding by wet molding, for example, a slurry is obtained by conducting the fine pulverization step by a wet method and then this slurry is concentrated to a predetermined concentration to obtain a slurry for wet molding. Molding can be conducted using this slurry for wet molding. The concentration of slurry can be conducted by centrifugation or a filter press. The content of ferrite particles in the slurry for wet molding is, for example, from 30% to 80% by mass. Examples of a dispersion medium for dispersing the ferrite particles in the slurry may include water. Surfactants such as gluconic acid, gluconates, and sorbitol may be added to the slurry. A nonaqueous solvent may be used as the dispersion medium. As the nonaqueous solvent, an organic solvent such as toluene or xylene can be used. In this case, a surfactant such as oleic acid may be added. Incidentally, the slurry for wet molding may be prepared by adding a dispersion medium and the like to the ferrite particles which have been subjected to fine pulverization and are in a dry state.

In the wet molding, this slurry for wet molding is then subjected to molding in a magnetic field. In that case, the molding pressure is, for example, from 9.8 to 49 MPa (0.1 to 0.5 ton/cm$^2$). The magnetic field to be applied is, for example, from 398 to 1194 kA/m (5 to 15 kOe).

In the firing step, the compact obtained in the molding step is fired to obtain a ferrite sintered magnet. The firing of compact can be conducted in an oxidizing atmosphere such as air. The firing temperature may be, for example, 1050° C. to 1270° C. or 1080° C. to 1240° C. In addition, the firing time (time for holding the compact at the firing temperature) is, for example, from 0.5 to 3 hours.

In the firing step, for example, the temperature may be raised from room temperature to about 100° C. at a rate of temperature rise of about 0.5° C./min before reaching the sintering temperature. This makes it possible to sufficiently dry the compact before sintering proceeds. In addition, it possible to sufficiently remove the surfactant added in the molding step. Incidentally, these treatments may be conducted at the beginning of the firing step or may be separately conducted before the firing step.

A ferrite sintered magnet can be manufactured in this manner. In the case of manufacturing a bonded magnet but not a ferrite sintered magnet, a bonded magnet can be obtained by impregnating the compact obtained in the molding step described above with a resin and heating the compact impregnated to cure the resin. Specifically, the compact is immersed in a resin-containing solution prepared in advance, and subjected to defoaming in a well closed vessel by pressure reduction to allow the resin-containing solution to penetrate into the voids of the compact. Thereafter, the compact is taken out of the resin-containing solution, and the excess resin-containing solution attached to the surface of the compact is removed. A centrifuge and the like may be used to remove the excess resin-containing solution.

It is possible to promote defoaming, to increase the amount of resin impregnated, and to diminish the voids in the compact by immersing the compact in a solvent such as toluene while putting the compact in the well closed vessel and holding the compact in a reduced pressure atmosphere before immersing the compact in a resin-containing solution.

The method of manufacturing the ferrite particles, ferrite sintered magnet, and bonded magnet is not limited to the example described above. For example, in the case of manufacturing a bonded magnet, the steps up to the pulverization step described above may be carried out, then the ferrite particles obtained and a resin may be mixed together, and this may be molded in a magnetic field to obtain a bonded magnet containing ferrite particles and a resin.

In addition, for example, the molding step and the firing step may be conducted according to the following procedure. In other words, the molding step may be conducted by a Ceramic Injection Molding (CIM) method or Powder Injection Molding (PIM (a kind of powder injection molding)). In the CIM method, first, dried ferrite particles are heated and kneaded together with a binder resin to form a pellet. This pellet is injection-molded into a mold to which a magnetic field is applied to obtain a preliminary compact. A compact is obtained by subjecting this preliminary compact to the binder removing treatment. A more detailed procedure is described below.

The finely pulverized slurry which has been obtained by wet pulverization and contains ferrite particles are dried. The drying temperature is preferably from 80° C. to 150° C. and more preferably from 100° C. to 120° C. The drying time is preferably from 1 to 40 hours and more preferably from 5 to 25 hours. The average particle diameter of the primary particles of the magnetic powder after being dried is preferably from 0.08 to 2 μm and more preferably from 0.1 to 1 μm.

The ferrite particles after being dried are kneaded together with organic components such as a binder resin, waxes, a lubricant, a plasticizer, and a sublimation compound and molded into pellets using a pelletizer and the like. The organic component is contained in the compact at preferably from 35% to 60% by volume and more preferably from 40% to 55% by volume. Kneading may be conducted using, for example, a kneader. As a pelletizer, for example, a twin screw single screw extruder is used. Kneading and pelletizing may be conducted while conducting heating depending on the melting temperature of the organic component to be used.

As the binder resin, a polymer compound such as a thermoplastic resin is used. Examples of the thermoplastic resin may include polyethylene, polypropylene, ethylene vinyl acetate copolymer, atactic polypropylene, acrylic polymer, polystyrene, and polyacetal.

As the waxes, synthetic waxes such as paraffin wax, urethanized wax, and polyethylene glycol are used in addition to natural waxes such as carnauba wax, montan wax, and beeswax.

Examples of the lubricant may include fatty acid esters. Examples of the plasticizer may include an ester of phthalic acid.

The amount of binder resin added is preferably from 3% to 20% by mass with respect to 100% by mass of ferrite particles. The amount of waxes added is preferably from 3% to 20% by mass with respect to 100% by mass of ferrite particles. The amount of lubricant added is preferably from 0.1% to 5% by mass with respect to 100% by mass of ferrite particles. The amount of plasticizer added is preferably from 0.1% to 5% by mass with respect to 100% by mass of binder resin.

Figure 4:
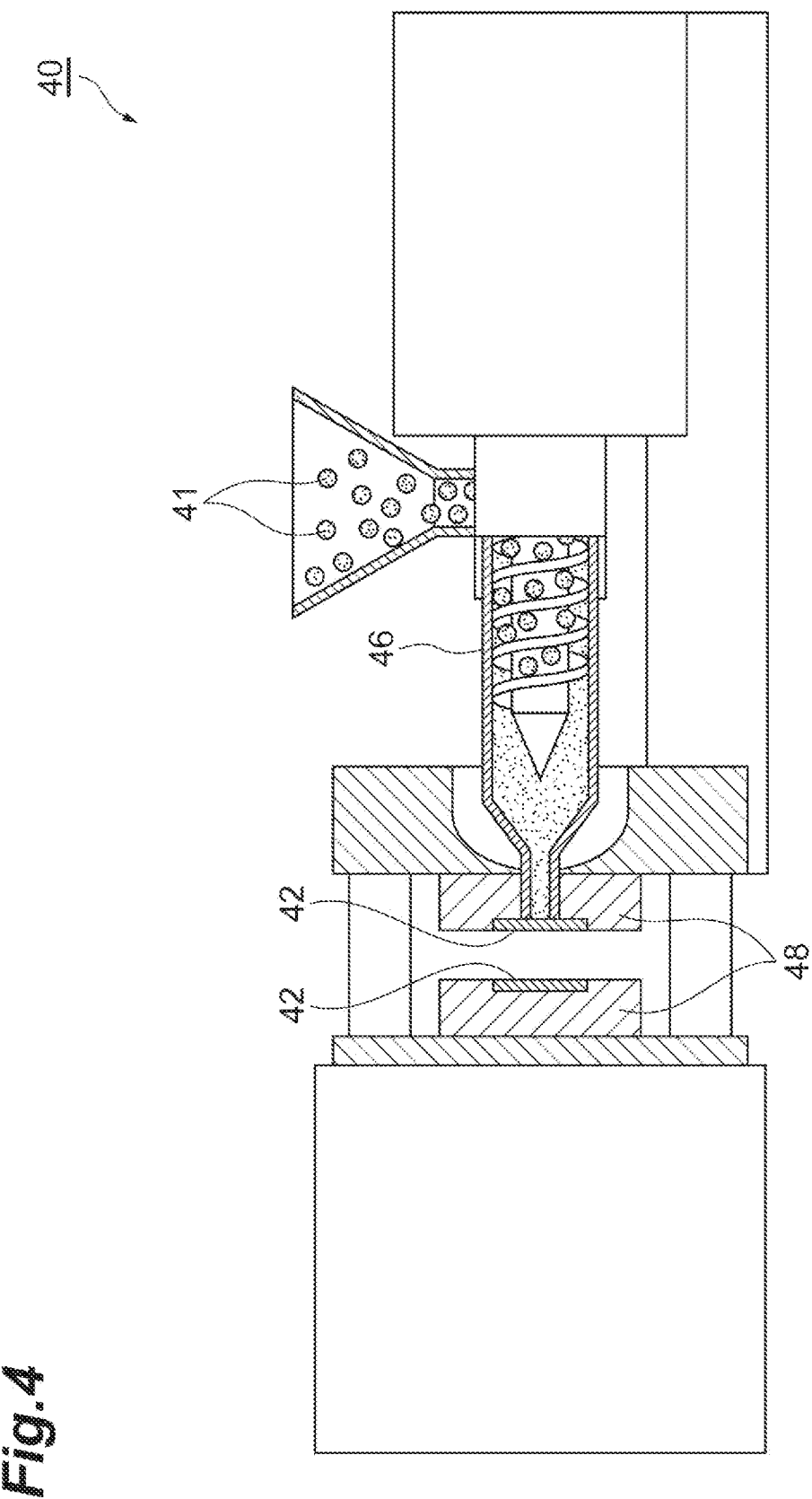
FIG. 4 is a cross-sectional view of an essential part of a magnetic field injection molding apparatus.

Next, a pellet 41 is injection-molded into a mold 48 using a magnetic field injection molding apparatus 40 illustrated in FIG. 4. Before injection into the mold 48, the mold 48 is closed and a magnetic field is applied to the mold 48 in a state in which a cavity 42 is formed in the interior thereof. The pellet 41 is heated and melted, for example, to from 160° C. to 230° C. inside an extruder 46 and injected into the cavity 42 of the mold 48 by a screw. The temperature of the mold 48 is, for example, from 20° C. to 80° C. The magnetic field applied to the mold 48 may be set to about from 398 to 1592 kA/m (5 to 20 kOe). A preliminary compact is obtained using the magnetic field injection molding apparatus 40 in this manner.

The preliminary compact obtained is subjected to a heat treatment at a temperature of from 100° C. to 600° C. in the air or nitrogen to conduct a binder removing treatment, and a compact is thus obtained. In the case using plural kinds of organic components, the binder removing treatment may be conducted by being divided into plural times.

Subsequently, in the firing step, the compact subjected to the binder removing treatment is sintered, for example, in the air at a temperature of preferably from 1100° C. to 1250° C., more preferably from 1160° C. to 1230° C. for about 0.2 to 3 hours, and the magnet 10 is thus obtained.

Several embodiments of the present invention have been described above, but the present invention is not limited to the embodiments described above. For example, the shapes of the ferrite sintered magnet 10 and the bonded magnet 20 are not limited to the shape illustrated in FIG. 1 and can be appropriately changed to shapes suitable for the respective applications described above. In addition, the motor is also not limited to the embodiments illustrated in FIGS. 2 and 3 and may be a motor in another form.

EXAMPLES

The contents of the present invention will be described in more detail with reference to Examples and Comparative Examples, but the present invention is not limited to the following Examples.

Manufacture of Ferrite Sintered Magnet

Production Examples 1-1 to 1-13

As raw materials, iron oxide ($Fe_2O_3$), calcium carbonate ($CaCO_3$), strontium carbonate ($SrCO_3$), cobalt oxide ($Co_3O_4$), and lanthanum hydroxide ($La(OH)_3$) were prepared. These raw materials were blended together so that the compositions represented by General Formulas (I) and (II) were as presented in Table 1. Boron oxide ($B_2O_3$) was added to the blend thus obtained in a predetermined amount, and mixing and pulverization of the mixture were conducted for 10 minutes using a wet attritor, thereby obtaining a slurry (blending step). In Production Examples 1-1 to 1-13, the blending ratios of the respective raw materials were changed as presented in Table 1 so as to obtain ferrite sintered magnets having compositions different from one another.

This slurry was dried, and then calcination in which the slurry was held at 1300° C. for 2 hours in the air was conducted, thereby obtaining a calcined powder (calcination step). The calcined powder obtained was coarsely pulverized for 10 minutes using a small rod vibration mill to obtain a coarse powder. Silicon oxide ($SiO_2$) was added to this coarse powder at 0.2% by mass. Thereafter, the mixture was finely pulverized for 35 hours using a wet ball mill to obtain a slurry containing ferrite particles (pulverization step).

The slurry obtained after the fine pulverization was adjusted so as to have a solid concentration of from 73% to 75% to obtain a slurry for wet molding. This slurry for wet molding was molded in an applied magnetic field of 796 kA/m (10 kOe) using a wet magnetic field molding machine to obtain a compact having a column shape with a diameter of 30 mm and a thickness of 15 mm (molding step). The compact obtained was dried at room temperature in the air and then subjected to firing in which the compact was held at 1180° C. for 1 hour in the air (firing step). A columnar ferrite sintered magnet was obtained in this manner.

Evaluation 1 of Ferrite Sintered Magnet

<Evaluation on Magnetic Properties>

The upper and lower surfaces of the ferrite sintered magnet were machined, and then the magnetic properties of the ferrite sintered magnet at 20° C. were measured at a maximum applied magnetic field of 29 kOe using a BH tracer. The residual magnetic flux density [Br (G)] and the coercive force [HcJ (Oe)] were thus determined. The results thereof are presented in Table 1.

<Composition Analysis>

The contents of B (boron) and Si (silicon) in the ferrite sintered magnet were measured according to the following procedure. With 1 g of sodium peroxide and 1 g of sodium carbonate, 0.1 g of a sample of the ferrite sintered magnet was mixed, heated, and thus melted. The melt was dissolved in a solution of 40 ml of pure water and 10 ml of hydrochloric acid, and then pure water was added thereto until the volume of solution reached 100 ml. The content of boron in terms of $B_2O_3$ and the content of silicon in terms of $SiO_2$ were determined using this solution by ICP-atomic emission spectroscopy (ICP-AES). For ICP-atomic emission spectroscopy, an analyzer manufactured by Shimadzu Corporation (apparatus name: ICPS 8100CL) was used, and matrix matching was conducted upon the measurement. x, y, m, x1, and x2 in General Formula (I) or (II) above were calculated based on the blending ratio of the raw materials in the blending step. The results of these are presented in Table 1. Incidentally, "A" and "E" in each table correspond to A and E in General Formulas (I) and (II), respectively. In addition, Examples and Comparative Examples were distinguished from each other in the column for remarks in each table.

TABLE 1

| Production Example | Composition | | | | | | | Magnetic properties | | Remarks |
| --- | --- | --- | --- | --- | --- | --- | --- | --- | --- | --- |
| | Fe m-y | Co y | R (La) 1-x | Ca x1 | A E (Sr) x2 | X (=x1 + x2) | $B_2O_3$ % by mass | Br (G) | HcJ (Oe) | |
| 1-1 | 9.3 | 0.28 | 0.56 | 0.44 | 0.00 | 0.44 | 0.02 | 4222 | 3630 | Comparative Example |
| 1-2 | 9.4 | 0.28 | 0.57 | 0.43 | 0.00 | 0.43 | 0.05 | 4247 | 3658 | Comparative Example |
| 1-3 | 9.5 | 0.30 | 0.57 | 0.43 | 0.00 | 0.43 | 0.11 | 4302 | 5045 | Example |
| 1-4 | 9.5 | 0.30 | 0.57 | 0.43 | 0.00 | 0.43 | 0.14 | 4320 | 5483 | Example |
| 1-5 | 9.5 | 0.30 | 0.55 | 0.45 | 0.00 | 0.45 | 0.21 | 4311 | 6707 | Example |
| 1-6 | 9.5 | 0.29 | 0.58 | 0.42 | 0.00 | 0.42 | 0.22 | 4313 | 6764 | Example |
| 1-7 | 9.5 | 0.30 | 0.58 | 0.42 | 0.00 | 0.42 | 0.34 | 4148 | 5921 | Example |
| 1-8 | 9.5 | 0.30 | 0.58 | 0.42 | 0.00 | 0.42 | 0.42 | 3829 | 5238 | Example |
| 1-9 | 9.5 | 0.30 | 0.58 | 0.42 | 0.00 | 0.42 | 0.53 | 3571 | 4960 | Example |
| 1-10 | 9.5 | 0.30 | 0.58 | 0.42 | 0.00 | 0.42 | 0.60 | 3512 | 4933 | Example |
| 1-11 | 9.5 | 0.30 | 0.58 | 0.42 | 0.00 | 0.42 | 0.64 | 3481 | 4734 | Comparative Example |
| 1-12 | 9.5 | 0.30 | 0.58 | 0.42 | 0.00 | 0.42 | 0.85 | 2283 | 2124 | Comparative Example |
| 1-13 | 9.5 | 0.30 | 0.58 | 0.42 | 0.00 | 0.42 | 1.06 | 1310 | 858 | Comparative Example |

As presented in Table 1, the coercive force was low in Production Examples 1-1 and 1-2 in which the content of $B_2O_3$ was less than 0.1% by mass. In Production Examples 1-11 to 1-13 in which the content of $B_2O_3$ was more than 0.6% by mass, both the residual magnetic flux density and the coercive force were low. On the other hand, it has been confirmed that Production Examples 1-3 to 1-9 in which the content of $B_2O_3$ is from 0.1% to 0.6% by mass have a sufficiently high coercive force. In addition, it has been confirmed that Production Examples 1-3 to 1-7 in which the content of $B_2O_3$ is more than 0.1% by mass and 0.4% by mass or less have a sufficiently high coercive force and a high residual magnetic flux density. The content of silicon in terms of $SiO_2$ in Production Examples 1-1 to 1-13 was 0.2% by mass.

Production Examples 2-1 to 2-9

The raw materials used in Production Examples 1-1 to 1-13 were blended together so that the compositions represented by General Formulas (I) and (II) were as presented in Table 2, and blends were thus prepared. In Production Example 2-2 and Production Example 2-4, $B_2O_3$ was blended with the blends at a proportion of about 0.6% by mass. Ferrite sintered magnets were manufactured and evaluated in the same manner as in Production Examples 1-1 to 1-13 except that the blending proportion was changed as described above. The results are presented in Table 2.

TABLE 2

| Production Example | Composition | | | | | | $B_2O_3$ % by mass | Magnetic properties | | Remarks |
| --- | --- | --- | --- | --- | --- | --- | --- | --- | --- | --- |
| | Fe m-y | Co y | R (La) 1-x | Ca x1 | A E (Sr) x2 | x (=x1 + x2) | | Br (G) | HcJ (Oe) | |
| 2-1 | 8.2 | 0.30 | 0.50 | 0.00 | 0.50 | 0.50 | 0.00 | 3339 | 4854 | Comparative Example |
| 2-2 | 8.2 | 0.30 | 0.50 | 0.00 | 0.50 | 0.50 | 0.22 | 4315 | 3936 | Comparative Example |
| 2-3 | 8.2 | 0.30 | 0.50 | 0.25 | 0.25 | 0.50 | 0.00 | 3910 | 4273 | Comparative Example |
| 2-4 | 8.2 | 0.30 | 0.50 | 0.25 | 0.25 | 0.50 | 0,22 | 4216 | 5326 | Example |
| 2-5 | 8.2 | 0.30 | 0.50 | 0.45 | 0.05 | 0.50 | 0.22 | 4299 | 6652 | Example |
| 2-6 | 8.2 | 0.30 | 0.50 | 0.40 | 0.10 | 0.50 | 0.22 | 4271 | 6158 | Example |
| 2-7 | 8.2 | 0.30 | 0.50 | 0.35 | 0.15 | 0.50 | 0.22 | 4304 | 5900 | Example |
| 2-8 | 8.2 | 0.30 | 0.50 | 0.30 | 0.20 | 0.50 | 0.22 | 4296 | 5516 | Example |
| 2-9 | 8.2 | 0.30 | 0.50 | 0.20 | 0.30 | 0.50 | 0.22 | 4206 | 5226 | Example |

The content of silicon in terms of $SiO_2$ in Production Examples 2-1 to 2-9 was 0.2% by mass. As presented in Table 2, Production Examples 2-4 to 2-9 in which Ca was contained in a predetermined amount as well as $B_2O_3$ was contained in a predetermined amount had a sufficiently higher coercive force than Production Examples 2-1 and 2-2 in which Ca was not contained and Production Example 2-3 in which $B_2O_3$ was not contained. From this fact, it has been confirmed that the coercive force is improved by not only containing $B_2O_3$ but also by setting the ferrite sintered magnet to have a predetermined composition containing Ca.

Production Examples 3-1 to 3-4

Barium carbonate ($BaCO_3$) was used instead of strontium carbonate ($SrCO_3$) among the raw materials used in Production Examples 2-1 to 2-4, and the raw materials were blended together so that the compositions represented by General Formulas (I) and (II) were as presented in Table 3, and blends were thus prepared. In Production Example 3-2 and Production Example 3-4, $B_2O_3$ was blended with the blends at a proportion of about 0.6% by mass. Ferrite sintered magnets were manufactured and evaluated in the same manner as in Production Examples 1-1 to 1-13 except that the blending proportion was changed as described above. The results are presented in Table 3.

The content of silicon in terms of $SiO_2$ in Production Examples 4-1 to 4-5 was 0.2% by mass. In Table 4, Production Examples 4-2 to 4-5 show changes in magnetic properties in a case in which the proportion of Fe which is the element B of the ferrite sintered magnet changes. It has been confirmed that the coercive force can be sufficiently

TABLE 3

| Production Example | Composition | | | | | | $B_2O_3$ | Magnetic properties | | Remarks |
|---|---|---|---|---|---|---|---|---|---|---|
| | Fe | Co | R | A | | | | | | |
| | | | (La) | Ca | E (Ba) | x | | Br | HcJ | |
| | m-y | y | 1-x | x1 | x2 | (=x1 + x2) | % by mass | (G) | (Oe) | |
| 3-1 | 8.2 | 0.30 | 0.50 | 0.00 | 0.50 | 0.50 | 0.00 | 3363 | 3046 | Comparative Example |
| 3-2 | 8.2 | 0.30 | 0.50 | 0.00 | 0.50 | 0.50 | 0.22 | 4100 | 2724 | Comparative Example |
| 3-3 | 8.2 | 0.30 | 0.50 | 0.25 | 0.25 | 0.50 | 0.00 | 4159 | 3776 | Comparative Example |
| 3-4 | 8.2 | 0.30 | 0.50 | 0.25 | 0.25 | 0.50 | 0.22 | 4205 | 4901 | Example |

The content of silicon in terms of $SiO_2$ in Production Examples 3-1 to 3-4 was 0.2% by mass. As presented in Table 3, Production Example 3-4 in which Ca was contained in a predetermined amount as well as $B_2O_3$ was contained in a predetermined amount had a sufficiently higher coercive force than Production Examples 3-1 and 3-2 in which Ca was not contained and Production Example 3-3 in which $B_2O_3$ was not contained. In addition, from the comparison between Table 2 and Table 3, it has been confirmed that an increase in coercive force by Sr is higher than that by Ba although the residual magnetic flux density hardly changes when a case in which the element A is Sr and a case in which the element A is Ba are compared to each other.

Production Examples 4-1 to 4-5

The raw materials used in Production Examples 1-1 to 1-13 were blended together so that the compositions represented by General Formulas (I) and (II) were as presented in Table 4, and blends were thus prepared. In Production Example 4-1, $B_2O_3$ was blended with the blend at a proportion of about 0.06% by mass. In Production Examples 4-2 to 4-5, $B_2O_3$ was blended with the blends at a proportion of about 0.6% by mass. Ferrite sintered magnets were manufactured and evaluated in the same manner as in Production Examples 1-1 to 1-13 except that the blending proportion was changed as described above. The results are presented in Table 4.

increased even when the value of m-y in General Formulas (I) and (II) changes in a case in which the content of B in terms of $B_2O_3$ is 0.22% by mass. However, Br tends to decrease when the value of m-y is too great.

The compositions of Production Example 4-1 and Production Example 4-4 differ from each other only in the content of B. From the comparison of the results of these to each other as well, it has been confirmed that the coercive force can be sufficiently increased by setting the content of B to 0.1% by mass or more in terms of $B_2O_3$.

Production Examples 5-1 and 5-2

The raw materials used in Production Examples 1-1 to 1-13 were blended together so that the compositions represented by General Formulas (I) and (II) were as presented in Table 5, and blends were thus prepared. In Production Example 5-1 and Production Example 5-2, $B_2O_3$ was blended with the blends at a proportion of 0.6% by mass. Ferrite sintered magnets were manufactured and evaluated in the same manner as in Production Examples 1-1 to 1-12 except that the blending proportion was changed as described above. The results are presented in Table 5.

TABLE 4

| Production Example | Composition | | | | | | $B_2O_3$ | Magnetic properties | | Remarks |
|---|---|---|---|---|---|---|---|---|---|---|
| | Fe | Co | R | A | | | | | | |
| | | | (La) | Ca | E (Sr) | x | | Br | HcJ | |
| | m-y | y | 1-x | x1 | x2 | (=x1 + x2) | % by mass | (G) | (Oe) | |
| 4-1 | 11.2 | 0.30 | 0.40 | 0.60 | 0.00 | 0.60 | 0.05 | 3914 | 3793 | Comparative Example |
| 4-2 | 9.2 | 0.30 | 0.40 | 0.60 | 0.00 | 0.60 | 0.22 | 4212 | 4910 | Example |
| 4-3 | 10.2 | 0.30 | 0.40 | 0.60 | 0.00 | 0.60 | 0.22 | 3851 | 5050 | Example |
| 4-4 | 11.2 | 0.30 | 0.40 | 0.60 | 0.00 | 0.60 | 0.22 | 3445 | 5129 | Example |
| 4-5 | 12.2 | 0.30 | 0.40 | 0.60 | 0.00 | 0.60 | 0.22 | 3459 | 5094 | Example |

TABLE 5

| Production Example | Composition | | | | | | $B_2O_3$ | Magnetic properties | | Remarks |
|---|---|---|---|---|---|---|---|---|---|---|
| | Fe m-y | Co y | R (La) 1-x | A Ca x1 | E (Sr) x2 | x (=x1 + x2) | % by mass | Br (G) | HcJ (Oe) | |
| 5-1 | 7.2 | 0.30 | 0.50 | 0.50 | 0.00 | 0.50 | 0.22 | 4130 | 5259 | Example |
| 5-2 | 8.2 | 0.30 | 0.50 | 0.50 | 0.00 | 0.50 | 0.22 | 4332 | 6797 | Example |

The content of silicon in terms of $SiO_2$ in Production Examples 5-1 and 5-2 was 0.2% by mass. In Production Example 5-1 and Production Example 5-2 presented in Table 5, the proportion of R is increased and the proportions of Fe and element A are decreased as compared to those in Production Examples 4-2 to 4-5 in Table 4. In Production Examples presented in Table 5 as well, it has been confirmed that a ferrite sintered magnet having a high coercive force is obtained.

Production Examples 6-1 to 6-5

The raw materials used in Production Examples 1-1 to 1-13 were blended together so that the compositions represented by General Formulas (I) and (II) were as presented in Table 6, and blends were thus prepared. In Production Example 6-1, $B_2O_3$ was blended with the blend at a proportion of about 0.06% by mass. In Production Examples 6-2 to 6-5, $B_2O_3$ was blended with the blends at a proportion of about 0.6% by mass. Ferrite sintered magnets were manufactured and evaluated in the same manner as in Production Examples 1-1 to 1-13 except that the blending proportion was changed as described above. The results are presented in Table 6.

Examples 6-1 to 6-5 show changes in magnetic properties in a case in which the proportion of Fe which is the element B of the ferrite sintered magnet changes. The coercive force can be sufficiently highly maintained even when the value of m-y in General Formulas (I) and (II) changes in a case in which the content of B (boron) in terms of $B_2O_3$ is 0.22% by mass. Moreover, it has been confirmed that the residual magnetic flux density can also be increased in a case in which the value of m is approximately from 6.5 to 8.5.

The compositions of Production Example 6-1 and Production Example 6-4 differ from each other only in the content of B. From the comparison of the results of these to each other as well, it has been confirmed that the coercive force can be sufficiently increased by setting the content of B to 0.1% by mass or more in terms of $B_2O_3$.

Production Examples 7-1 to 7-3

The raw materials used in Production Examples 1-1 to 1-13 were blended together so that the compositions represented by General Formulas (I) and (II) were as presented in Table 7, and blends were thus prepared. In Production

TABLE 6

| Production Example | Composition | | | | | | $B_2O_3$ | Magnetic properties | | Remarks |
|---|---|---|---|---|---|---|---|---|---|---|
| | Fe m-y | Co y | R (La) 1-x | A Ca x1 | E (Sr) x2 | x (=x1 + x2) | % by mass | Br (G) | HcJ (Oe) | |
| 6-1 | 7.2 | 0.30 | 0.60 | 0.40 | 0.00 | 0.40 | 0.04 | 4105 | 4860 | Comparative Example |
| 6-2 | 5.2 | 0.30 | 0.60 | 0.40 | 0.00 | 0.40 | 0.22 | 3520 | 6213 | Example |
| 6-3 | 6.2 | 0.30 | 0.60 | 0.40 | 0.00 | 0.40 | 0.22 | 3936 | 7086 | Example |
| 6-4 | 7.2 | 0.30 | 0.60 | 0.40 | 0.00 | 0.40 | 0.22 | 4107 | 6769 | Example |
| 6-5 | 8.2 | 0.30 | 0.60 | 0.40 | 0.00 | 0.40 | 0.22 | 3694 | 5814 | Example |

The content of silicon in terms of $SiO_2$ in Production Examples 6-1 to 6-5 was 0.2% by mass. In Production Example 6-1 to Production Example 6-5 presented in Table 6, the proportion of R is further increased and the proportion of element A is further decreased as compared to those in Production Examples 5-1 and 5-2 in Table 5. Production Example 7-1 to Production Example 7-3, $B_2O_3$ was blended with the blends at a proportion of about 0.6% by mass. Ferrite sintered magnets were manufactured and evaluated in the same manner as in Production Examples 1-1 to 1-12 except that the blending proportion was changed as described above. The results are presented in Table 7.

TABLE 7

| Production Example | Composition | | | | | | $B_2O_3$ | Magnetic properties | | Remarks |
|---|---|---|---|---|---|---|---|---|---|---|
| | Fe m-y | Co y | R (La) 1-x | A Ca x1 | E (Sr) x2 | x (=x1 + x2) | % by mass | Br (G) | HcJ (Oe) | |
| 7-1 | 4.2 | 0.30 | 0.70 | 0.30 | 0.00 | 0.30 | 0.22 | 3152 | 7091 | Example |
| 7-2 | 5.2 | 0.30 | 0.70 | 0.30 | 0.00 | 0.30 | 0.22 | 3611 | 7169 | Example |
| 7-3 | 6.2 | 0.30 | 0.70 | 0.30 | 0.00 | 0.30 | 0.22 | 3447 | 6842 | Example |

The content of silicon in terms of $SiO_2$ in Production Examples 7-1 to 7-3 was 0.2% by mass. In Production Example 7-1 to Production Example 7-3 presented in Table 7, the proportion of R is further increased and the proportion of element A is further decreased as compared to those in Production Example 6-1 to Production Example 6-5 in Table 6. Production Examples 7-1 to 7-3 show changes in magnetic properties in a case in which the proportion of Fe which is the element B of the ferrite sintered magnet changes. A sufficiently high coercive force can be maintained even when the value of m-y in General Formulas (I) and (II) changes in a case in which the content of B (boron) in terms of $B_2O_3$ is 0.22% by mass.

Production Examples 8-1 to 8-6

The raw materials used in Production Examples 1-1 to 1-13 were blended together so that the compositions represented by General Formulas (I) and (II) were as presented in Table 8, and blends were thus prepared. In Production Example 8-1 to Production Example 8-6, $B_2O_3$ was blended with the blends at a proportion of about 0.6% by mass. Ferrite sintered magnets were manufactured and evaluated in the same manner as in Production Examples 1-1 to 1-13 except that the blending proportion was changed as described above. The results are presented in Table 8.

TABLE 8

| | Composition | | | | | | | Magnetic properties | | |
| | | R | | A | | | $B_2O_3$ | | | |
| Production Example | Fe m-y | Co y | (La) 1-x | Ca x1 | E (Sr) x2 | x (=x1 + x2) | % by mass | Br (G) | HcJ (Oe) | Remarks |
|---|---|---|---|---|---|---|---|---|---|---|
| 8-1 | 7.1 | 0.40 | 0.50 | 0.50 | 0.00 | 0.50 | 0.22 | 3974 | 5167 | Example |
| 8-2 | 7.6 | 0.40 | 0.50 | 0.50 | 0.00 | 0.50 | 0.22 | 4117 | 5764 | Example |
| 8-3 | 8.1 | 0.40 | 0.50 | 0.50 | 0.00 | 0.50 | 0.22 | 4256 | 6362 | Example |
| 8-4 | 9.1 | 0.40 | 0.50 | 0.50 | 0.00 | 0.50 | 0.22 | 4411 | 6875 | Example |
| 8-5 | 10.1 | 0.40 | 0.50 | 0.50 | 0.00 | 0.50 | 0.22 | 4190 | 5266 | Example |
| 8-6 | 12.1 | 0.40 | 0.50 | 0.50 | 0.00 | 0.50 | 0.22 | 4005 | 5066 | Example |

The content of silicon in terms of $SiO_2$ in Production Examples 8-1 to 8-6 was 0.2% by mass. In Production Example 8-1 to Production Example 8-6 presented in Table 8, the proportion of Co is increased as compared to that in Production Example 5-1 and Production Example 5-2 in Table 5. It is possible to obtain a ferrite sintered magnet having a sufficiently high coercive force even when the proportion of Co is as presented in Table 8. Production Example 8-1 to Production Example 8-6 show changes in magnetic properties in a case in which the proportion of Fe which is the element B of the ferrite sintered magnet changes. A sufficiently high coercive force can be maintained even when the value of m-y in General Formulas (I) and (II) changes in a case in which the content of B (boron) in terms of $B_2O_3$ is 0.22% by mass.

Production Examples 9-1 and 9-2

The raw materials used in Production Examples 1-1 to 1-13 were blended together so that the compositions represented by General Formulas (I) and (II) were as presented in Table 9, and blends were thus prepared. In Production Examples 9-1 and 9-2, $B_2O_3$ was blended with the blends at a proportion of about 0.6% by mass. Ferrite sintered magnets were manufactured and evaluated in the same manner as in Production Examples 1-1 to 1-13 except that the blending proportion was changed as described above. The results are presented in Table 9.

TABLE 9

| | Composition | | | | | | | Magnetic properties | | |
| | | R | | A | | | $B_2O_3$ | | | |
| Production Example | Fe m-y | Co y | (La) 1-x | Ca x1 | E (Sr) x2 | x (=x1 + x2) | % by mass | Br (G) | HcJ (Oe) | Remarks |
|---|---|---|---|---|---|---|---|---|---|---|
| 9-1 | 7.3 | 0.20 | 0.50 | 0.50 | 0.00 | 0.50 | 0.22 | 4102 | 6318 | Example |
| 9-2 | 8.3 | 0.20 | 0.50 | 0.50 | 0.00 | 0.50 | 0.22 | 3518 | 6777 | Example |

The content of silicon in terms of $SiO_2$ in Production Examples 9-1 and 9-2 was 0.2% by mass. In Production Examples 9-1 and 9-2 presented in Table 9, the proportion of Co is decreased as compared to that in Production Examples 5-1 and 5-2 in Table 5. It is possible to obtain a ferrite sintered magnet having a sufficiently high coercive force even when the proportion of Co is as presented in Table 9. Production Examples 9-1 and 9-2 show changes in magnetic properties in a case in which the proportion of Fe which is the element B of the ferrite sintered magnet changes. A sufficiently high coercive force can be maintained even when the value of m-y in General Formulas (I) and (II) changes in a case in which the content of B (boron) in terms of $B_2O_3$ is 0.22% by mass.

Production Examples 10-1 and 10-2

The raw materials used in Production Examples 1-1 to 1-13 were blended together so that the compositions represented by General Formulas (I) and (II) were as presented in Table 10, and blends were thus prepared. In Production Examples 10-1 and 10-2, $B_2O_3$ was blended with the blends at a proportion of about 0.55% by mass. Ferrite sintered magnets were manufactured and evaluated in the same manner as in Production Examples 1-1 to 1-13 except that the blending proportion was changed as described above and the temperature in the firing step was set to 1200° C. The results are presented in Table 10.

TABLE 10

| Production Example | Composition | | | | | | $B_2O_3$ | Magnetic properties | | Remarks |
|---|---|---|---|---|---|---|---|---|---|---|
| | Fe m-y | Co y | R (La) 1-x | Ca x1 | A E (Sr) x2 | x (=x1 + x2) | % by mass | Br (G) | HcJ (Oe) | |
| 10-1 | 3.2 | 0.30 | 0.80 | 0.20 | 0.00 | 0.20 | 0.21 | 3121 | 5133 | Example |
| 10-2 | 4.2 | 0.30 | 0.80 | 0.20 | 0.00 | 0.20 | 0.21 | 3002 | 5025 | Example |

The content of silicon in terms of $SiO_2$ in Production Examples 10-1 and 10-2 was 0.2% by mass. In Production Example 10-1 and Production Example 10-2 presented in Table 10, the proportion of R is further increased and the proportion of element A is further decreased as compared to those in Production Example 7-1 to Production Example 7-3 in Table 7. It has been confirmed that Production Example 10-1 and Production Example 10-2 also have a sufficiently high coercive force.

Production Example 11-1

The raw materials used in Production Examples 1-1 to 1-13 were blended together so that the compositions represented by General Formulas (I) and (II) were as presented in Table 11, and a blend was thus prepared. In Production Example 11-1, $B_2O_3$ was blended with the blend at a proportion of about 0.6% by mass. A ferrite sintered magnet was manufactured and evaluated in the same manner as in Production Examples 1-1 to 1-13 except that the blending proportion was changed as described above. The results are presented in Table 11. In Table 11, the results for other Production Examples described in some of the tables described above are concurrently presented in order to show the influence of the proportion of R and the like.

TABLE 11

| Production Example | Composition | | | | | | $B_2O_3$ | Magnetic properties | | Remarks |
|---|---|---|---|---|---|---|---|---|---|---|
| | Fe m-y | Co y | R (La) 1-x | Ca x1 | A E (Sr) x2 | x (=x1 + x2) | % by mass | Br (G) | HcJ (Oe) | |
| 4-2 | 9.2 | 0.30 | 0.40 | 0.60 | 0.00 | 0.60 | 0.22 | 4212 | 4910 | Example |
| 11-1 | 9.2 | 0.30 | 0.45 | 0.55 | 0.00 | 0.55 | 0.22 | 3640 | 5444 | Example |
| 9-2 | 8.3 | 0.20 | 0.50 | 0.50 | 0.00 | 0.50 | 0.22 | 3518 | 6777 | Example |
| 8-4 | 9.1 | 0.40 | 0.50 | 0.50 | 0.00 | 0.50 | 0.22 | 4411 | 6875 | Example |
| 1-6 | 9.5 | 0.29 | 0.58 | 0.42 | 0.00 | 0.42 | 0.22 | 4313 | 6764 | Example |

The content of silicon in terms of $SiO_2$ in Production Example 11-1 was 0.2% by mass.

Production Examples 12-1 to 12-3

In Production Examples 12-1 to 12-3, ferrite sintered magnets were manufactured and evaluated in the same manner as in Production Example 8-4 except that the proportion of silicon oxide ($SiO_2$) added in the pulverization step was set to from 0.3% to 0.6% by mass with respect to the coarse powder as presented in Table 12. The results are presented in Table 12. In Table 12, the results for Production Example 8-4 are concurrently presented. Incidentally, the compositions represented by General Formulas (I) and (II) in Production Examples 12-1 to 12-3 are the same as those in Production Example 8-4.

TABLE 12

| Production Example | Composition | | | Magnetic properties | | Remarks |
| --- | --- | --- | --- | --- | --- | --- |
| | $SiO_2$ % by mass | $B_2O_3$ % by mass | $SiO_2 + B_2O_3$ % by mass | Br (G) | HcJ (Oe) | |
| 8-3 | 0.20 | 0.22 | 0.42 | 4411 | 6875 | Example |
| 12-1 | 0.30 | 0.22 | 0.52 | 4403 | 6404 | Example |
| 12-2 | 0.40 | 0.22 | 0.62 | 4312 | 6294 | Example |
| 12-3 | 0.60 | 0.22 | 0.82 | 4110 | 5436 | Example |

From the results presented in Table 12, it has been confirmed that the magnetic properties can be increased when the content of $SiO_2$ is decreased.

Evaluation 2 of Ferrite Sintered Magnet

<Evaluation on Magnetic Properties>

The temperature dependency of the magnetic properties of the ferrite sintered magnets fabricated in Production Examples 8-1 to 8-6 described above was evaluated. For the evaluation, the sample of ferrite sintered magnet used in the [Evaluation 1 of ferrite sintered magnet] described above was used. Using a chiller and a cooling apparatus including a Peltier element, the sample of ferrite sintered magnet fabricated, the sample measurement peripheral portion of the BH tracer, and the atmosphere were cooled to −30° C. After the temperature of the sample and the measurement peripheral portion became stable, the magnetic properties were measured in the same manner as in the [Evaluation 1 of ferrite sintered magnet]. The residual magnetic flux density [Br (G)] and coercive force [HcJ (Oe)] at −30° C. were thus measured. The results thereof are presented in Table 13.

TABLE 13

| Production Example | Composition (Fe + Co)/(R + A) m | Magnetic properties | | | | Remarks |
| --- | --- | --- | --- | --- | --- | --- |
| | | B (G) | HcJ (Oe) | Temperature coefficient of HcJ (%/° C.) | Temperature coefficient of Br (%/° C.) | |
| 8-1 | 7.5 | 4336 | 5123 | 0.017 | −0.182 | Example |
| 8-2 | 8.0 | 4485 | 5778 | −0.005 | −0.179 | Example |
| 8-3 | 8.5 | 4635 | 6422 | −0.019 | −0.178 | Example |
| 8-4 | 9.5 | 4804 | 6978 | −0.030 | −0.178 | Example |
| 8-5 | 10.5 | 4563 | 5366 | −0.038 | −0.178 | Example |
| 8-6 | 12.5 | 4361 | 5218 | −0.060 | −0.178 | Example |

In Table 13, the temperature coefficient of HcJ and the temperature coefficient of Br are values determined by the following equations.

$$\text{Temperature coefficient of HcJ}(\%/°\text{C.})=[\text{HcJ}_{(20°\,C.)}-\text{HcJ}_{(-30°\,C.)}]/50(°\text{C.})/\text{HcJ}_{(20°\,C.)} \times 100$$

$$\text{Temperature coefficient of Br}(\%/°\text{C.})=[\text{Br}_{(20°\,C.)}-\text{Br}_{(-30°\,C.)}]/50\,(°\text{C.})/\text{Br}_{(20°\,C.)} \times 100$$

In the formulae above, $\text{HcJ}_{(20°\,C.)}$ and $\text{HcJ}_{(-30°\,C.)}$ denote HcJ (Oe) at 20° and −30° C., respectively. $\text{Br}_{(20°\,C.)}$ and $\text{Br}_{(-30°\,C.)}$ denote Br (G) at 20° C. and −30° C., respectively.

Figure 5:
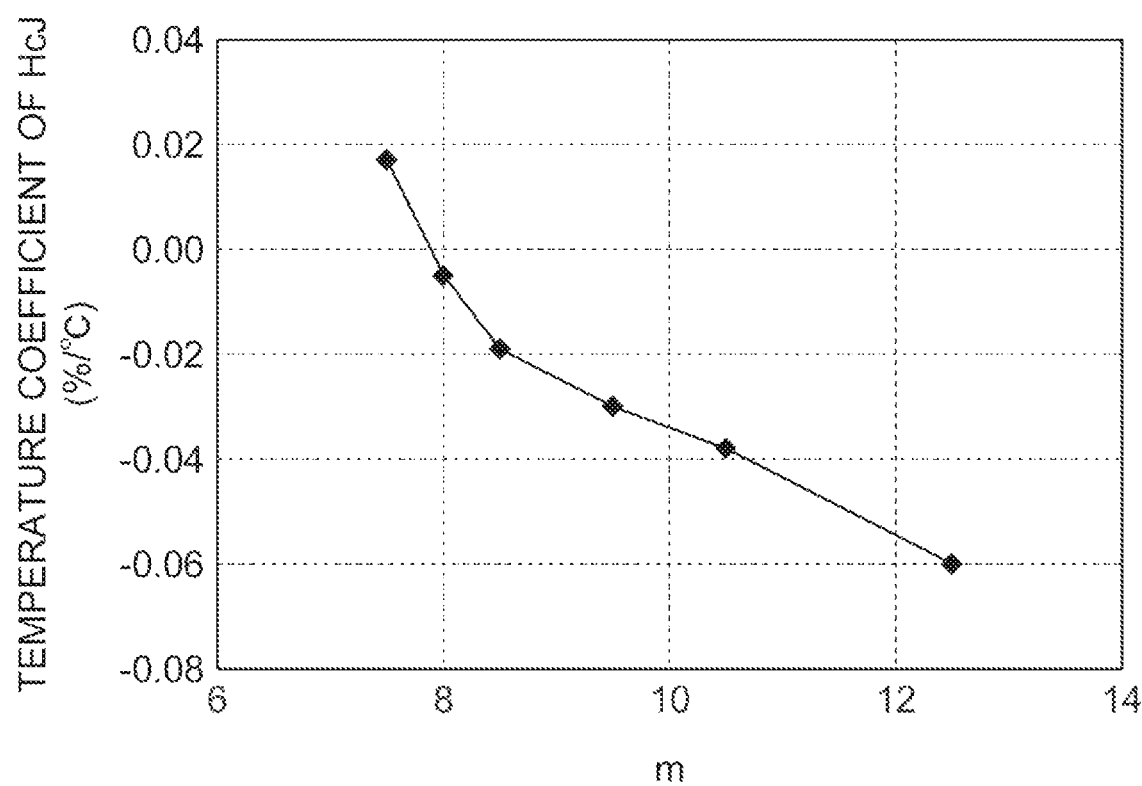
FIG. 5 is a graph which illustrates the relation between m and the temperature coefficient of HcJ in Production Examples 8-1 to 8-6.

In Production Examples 8-2 to 8-6, both the temperature coefficient of HcJ and the temperature coefficient of Br were negative values. From this fact, it has been confirmed that the ferrite sintered magnets exhibit sufficiently excellent low temperature properties. FIG. is a graph which illustrates the relation between the value of m and the value of the temperature coefficient of HcJ. As illustrated in FIG. 5, It has been confirmed that the temperature coefficient of HcJ can be sufficiently decreased by setting m in the composition of the ferrite sintered magnet to a range of more than 7.5. Furthermore, it has been confirmed that the absolute value of the temperature coefficient of Br can be sufficiently decreased.

The residual magnetic flux density [Br (G)] and the coercive force [HcJ (Oe)] at −30° C. were measured for the ferrite magnets of the other Production Examples as well, and the temperature coefficient of HcJ and temperature coefficient of Br described above were determined. The results of these are presented in Table 14 to Table 16.

TABLE 14

| Production Example | Composition $B_2O_3$ (% by mass) | Magnetic properties | | | | Remarks |
|---|---|---|---|---|---|---|
| | | Br (G) | HcJ (Oe) | Temperature coefficient of HcJ (%/° C.) | Temperature coefficient of Br (%/° C.) | |
| 1-1 | 0.02 | 4616 | 3503 | 0.070 | −0.187 | Comparative Example |
| 1-3 | 0.11 | 4702 | 5010 | 0.014 | −0.186 | Example |
| 1-5 | 0.21 | 4697 | 6791 | −0.025 | −0.179 | Example |
| 1-6 | 0.22 | 4697 | 6872 | −0.032 | −0.178 | Example |
| 1-10 | 0.60 | 3828 | 4970 | −0.015 | −0.180 | Example |

As presented in Table 14, it has been confirmed that the temperature coefficient of HcJ decreases and the low temperature properties are improved by setting the content of B in terms of $B_2O_3$ to a range of more than 0.11. It has been confirmed that the temperature coefficient of HcJ is negative characteristic, the absolute value of temperature coefficient of Br is less than |0.18|%/° C., and irreversible low temperature demagnetization does not occur by setting the content of B in terms of $B_2O_3$ to a range of more than 0.2% by mass.

TABLE 15

| Production Example | Composition R (La) 1-x | Magnetic properties | | | | Remarks |
|---|---|---|---|---|---|---|
| | | Br (G) | HcJ (Oe) | Temperature coefficient of HcJ (%/° C.) | Temperature coefficient of Br (%/° C.) | |
| 4-2 | 0.40 | 4606 | 4637 | 0.111 | −0.187 | |
| 11-1 | 0.45 | 3968 | 5335 | 0.040 | −0.180 | Example |
| 9-2 | 0.50 | 3831 | 6787 | −0.003 | −0.178 | Example |
| 8-4 | 0.50 | 4804 | 6978 | −0.030 | −0.178 | Example |
| 1-6 | 0.58 | 4677 | 6872 | −0.032 | −0.169 | Example |

As presented in Table 15, it has been confirmed that the temperature coefficient of HcJ is negative characteristic, the absolute value of temperature coefficient of Br is less than |0.18|%/° C., and irreversible low temperature demagnetization does not occur by setting R(1−x) in the composition of the ferrite sintered magnets to a range of more than 0.45, that is, by setting x to less than 0.55.

TABLE 16

| Production Example | Composition Co y | Magnetic properties | | | | Remarks |
|---|---|---|---|---|---|---|
| | | Br (G) | HcJ (Oe) | Temperature coefficient of HcJ (%/° C.) | Temperature coefficient of Br (%/° C.) | |
| 9-2 | 0.2 | 3831 | 6787 | −0.003 | −0.178 | Example |
| 5-2 | 0.3 | 4718 | 6831 | −0.010 | −0.178 | Example |
| 8-3 | 0.4 | 4635 | 6422 | −0.019 | −0.178 | Example |

As presented in Table 16, it has been confirmed that the temperature coefficient of HcJ is negative characteristic, the absolute value of temperature coefficient of Br is less than |0.18|%/° C., and irreversible low temperature demagnetization does not occur by setting Co(y) in the composition of the ferrite sintered magnets to from 0.2 to 0.4.

INDUSTRIAL APPLICABILITY

According to the present disclosure, a ferrite sintered magnet having a sufficiently high coercive force is provided. In addition, ferrite particles having a sufficiently high coercive force and a bonded magnet containing the same are provided. Furthermore, a motor and a generator which are equipped with the ferrite sintered magnet or the bonded magnet are provided.

REFERENCE SIGNS LIST

10: ferrite sintered magnet, 20: bonded magnet, 30: motor, 31: housing, 32: rotor, 33: bracket, 34 and 35: bearing, 36: rotor shaft, 37: rotor core, 40: magnetic field injection molding apparatus, 41: pellet, 42: cavity, 46: extruder, 48: mold.

The invention claimed is:

1. A ferrite sintered magnet comprising a ferrite phase having a magnetoplumbite-type crystal structure, wherein
x, y, and m satisfy the following Equations (1), (2), and (3) when composition of the ferrite sintered magnet is represented by $R_{1-x}A_xFe_{m-y}Co_y$, where R denotes at least one kind of element selected from rare earth elements including Y and A denotes Ca or Ca and elements including at least one kind selected from Sr or Ba:

$$0.2 \leq x \leq 0.8 \qquad (1)$$

$$0.1 \leq y \leq 0.65 \qquad (2)$$

$$3 \leq m < 14 \qquad (3), and$$

a content of B is more than 0.2% by mass and 0.6% by mass or less in terms of $B_2O_3$, and
wherein an absolute value of temperature coefficient of Br of the ferrite sintered magnet is less than |0.187|%/° C.

2. The ferrite sintered magnet according to claim 1, wherein the absolute value of temperature coefficient of Br of the ferrite sintered magnet is less than |0.18|%/° C.

3. The ferrite sintered magnet according to claim 1, wherein the following Equation (4) is satisfied:

$$m \geq 8.0 \qquad (4).$$

4. The ferrite sintered magnet according to claim 1, wherein the following Equation (5) is satisfied:

$$x < 0.55 \qquad (5).$$

5. The ferrite sintered magnet according to claim 1, wherein the following Equation (6) is satisfied:

$$0.2 \leq y \leq 0.4 \qquad (6).$$

6. A ferrite sintered magnet comprising a ferrite phase having a magnetoplumbite-type crystal structure, wherein
x, y, and m satisfy the following Equations (1), (2), and (3) when composition of the ferrite sintered magnet is represented by $R_{1-x}A_xFe_{m-y}Co_y$, where R denotes at least one kind of element selected from rare earth elements including Y and A denotes Ca or Ca and elements including at least one kind selected from Sr or Ba:

$$0.2 \leq x \leq 0.8 \qquad (1)$$

$$0.1 \leq y \leq 0.65 \qquad (2)$$

$$3 \leq m < 14 \qquad (3), and$$

a content of B is more than 0.2% by mass and 0.6% by mass or less in terms of $B_2O_3$, and
wherein a temperature coefficient of HcJ of the ferrite sintered magnet is 0%/° C. or less.

7. The ferrite sintered magnet according to claim 6, wherein the following Equation (4) is satisfied:

$$m \geq 8.0 \qquad (4).$$

8. The ferrite sintered magnet according to claim 6, wherein the following Equation (5) is satisfied:

$$x < 0.55 \qquad (5).$$

9. The ferrite sintered magnet according to claim 6, wherein the following Equation (6) is satisfied:

$$0.2 \leq y \leq 0.4 \qquad (6).$$

10. The ferrite sintered magnet according to claim 6, wherein an absolute value of temperature coefficient of Br of the ferrite sintered magnet is less than |0.18|%/° C.

11. A ferrite sintered magnet comprising a ferrite phase having a magnetoplumbite-type crystal structure, wherein
x, y, and m satisfy the following Equations (7), (2), and (8) when composition of the ferrite sintered magnet is represented by $R_{1-x}A_xFe_{m-y}Co_y$, where R denotes at least one kind of element selected from rare earth elements including Y and A denotes Ca or Ca and elements including at least one kind selected from Sr or Ba:

$$0.2 \leq x < 0.55 \qquad (7)$$

$$0.1 \leq y \leq 0.65 \qquad (2)$$

$$7.5 < m < 14 \qquad (8), and$$

a content of B is more than 0.2% by mass and 0.6% by mass or less in terms of $B_2O_3$.

12. The ferrite sintered magnet according to claim 11, wherein the following Equation (4) is satisfied:

$$m \geq 8.0 \qquad (4).$$

13. The ferrite sintered magnet according to claim 11, wherein the following Equation (6) is satisfied:

$$0.2 \leq y \leq 0.4 \qquad (6).$$

14. A ferrite sintered magnet comprising a ferrite phase having a magnetoplumbite-type crystal structure, wherein
x, y, and m satisfy the following Equations (1), (2), and (3) when composition of the ferrite sintered magnet is represented by $R_{1-x}A_xFe_{m-y}Co_y$, where R denotes at least one kind of element selected from rare earth elements including Y and A denotes Ca or Ca and elements including at least one kind selected from Sr or Ba:

$$0.2 \leq x \leq 0.8 \qquad (1)$$

$$0.1 \leq y \leq 0.65 \qquad (2)$$

$$3 \leq m < 14 \qquad (3), and$$

a content of B is from 0.1% to 0.6% by mass in terms of $B_2O_3$,
wherein an absolute value of temperature coefficient of Br of the ferrite sintered magnet is less than |0.187|%/° C., and
wherein HcJ of the ferrite sintered magnet at 20° C. is 4900 Oe or more.

15. A ferrite sintered magnet comprising a ferrite phase having a magnetoplumbite-type crystal structure, wherein
x, y, and m satisfy the following Equations (1), (2), and (3) when composition of the ferrite sintered magnet is represented by $R_{1-x}A_xFe_{m-y}Co_y$, where R denotes at least one kind of element selected from rare earth elements including Y and A denotes Ca or Ca and elements including at least one kind selected from Sr or Ba:

$$0.2 \leq x \leq 0.8 \qquad (1)$$

$$0.1 \leq y \leq 0.65 \qquad (2)$$

$$3 \leq m < 14 \qquad (3), and$$

a content of B is from 0.1% to 0.6% by mass in terms of $B_2O_3$,
wherein a temperature coefficient of HcJ of the ferrite sintered magnet is 0%/° C. or less, and wherein HcJ of the ferrite sintered magnet at 20° C. is 4900 Oe or more.

16. A ferrite sintered magnet comprising a ferrite phase having a magnetoplumbite-type crystal structure, wherein x, y, and m satisfy the following Equations (7), (2), and (8) when composition of the ferrite sintered magnet is represented by $R_{1-x}A_xFe_{m-y}Co_y$, where R denotes at least one kind of element selected from rare earth elements including Y and A denotes Ca or Ca and elements including at least one kind selected from Sr or Ba:

$$0.2 \leq x < 0.55 \quad (7)$$

$$0.1 \leq y \leq 0.65 \quad (2)$$

$$7.5 < m < 14 \quad (8), \text{ and}$$

a content of B is from 0.1% to 0.6% by mass in terms of $B_2O_3$, and wherein HcJ of the ferrite sintered magnet at 20° C. is 4900 Oe or more.

* * * * *